United States Patent [19]

Beer et al.

[11] Patent Number: 5,799,849

[45] Date of Patent: Sep. 1, 1998

[54] PROPANE TANK SAFETY CARRIER

[76] Inventors: Ivan L. Beer; Loydene M. Beer, both of 16517 NE. 12th St., Vancouver, Wash. 98684

[21] Appl. No.: 821,368

[22] Filed: Mar. 20, 1997

[51] Int. Cl.⁶ ................................................. B60R 11/00
[52] U.S. Cl. .......................... 224/403; 224/282; 224/549; 248/278.1
[58] Field of Search ................................. 224/402, 403, 224/282, 497, 503, 534, 536, 548, 549, 553, 558, 42.38, 42.39; 248/507, 278.1

[56] References Cited

U.S. PATENT DOCUMENTS

| | | |
|---|---|---|
| 1,018,696 | 2/1912 | Cronk . |
| 2,939,585 | 6/1960 | Burgin .................... 248/278.1 X |
| 3,565,384 | 2/1971 | Lockwood . |
| 3,753,543 | 8/1973 | Burrell et al. . |
| 3,765,635 | 10/1973 | Burrell et al. . |
| 3,765,636 | 10/1973 | Burrell et al. . |
| 4,006,852 | 2/1977 | Pilsner et al. . |
| 4,007,863 | 2/1977 | Norris . |
| 4,486,004 | 12/1984 | Drewitz et al. . |
| 4,770,428 | 9/1988 | Sugiyama . |
| 4,860,986 | 8/1989 | Couzens . |
| 4,887,784 | 12/1989 | Kayali ..................... 248/278.1 X |
| 4,932,575 | 6/1990 | Ware ........................... 224/403 |
| 5,104,015 | 4/1992 | Johnson .................... 224/402 X |

*Primary Examiner*—Renee S. Luebke
*Attorney, Agent, or Firm*—Kolisch, Hartwell, Dickinson, McCormack & Heuser

[57] ABSTRACT

A safety carrier for stabilizing a pressure-fluid bottle in an upright position in a pickup box in a truck has a carrier frame operatively anchored to the truck's frame and a rigid ring connected to the frame in an articulated manner. The ring is on a swivel mount at an end of a pivoting arm. The arm is attached to the frame. The ring may be selectively changed by a user, without disconnecting from the frame, between an operative configuration and a stowage configuration. In the operative configuration, the ring is generally horizontal and projects out over the pickup box's floor to receive and fit closely about the pressure fluid bottle. An adjustable strap attached at one end to the ring includes a hook at an opposite end for securing a flange on the bottle. In the stowage configuration, the ring is rotated to a generally vertical position and the arm is pivoted to swing the ring flush against a wall of the pickup box. The carrier frame is anchored to a lip on the pickup box wall by a clamping portion. The carrier frame is adjustable in height to accommodate differently sized trucks. The ring may be coupled to the carrier frame at an adjustable relative height to accommodate differently sized bottles. The arm is captured in place in a tube welded to the frame by a safety pin inserted through a safety pin aperture defined radially through the arm.

19 Claims, 3 Drawing Sheets

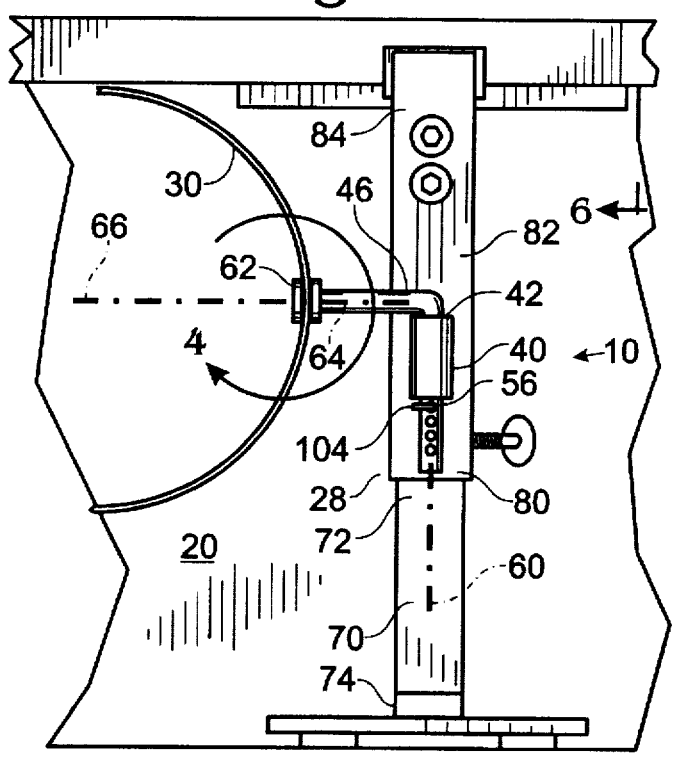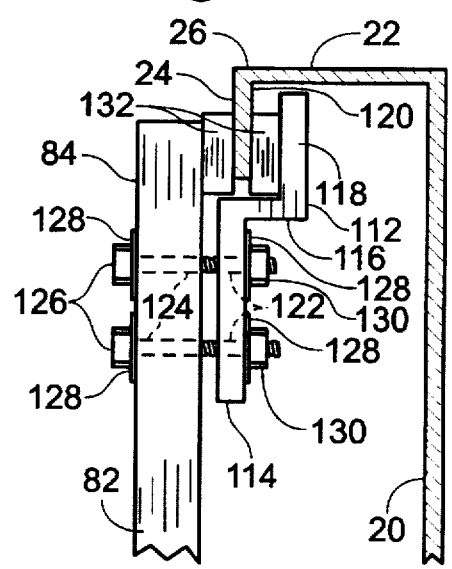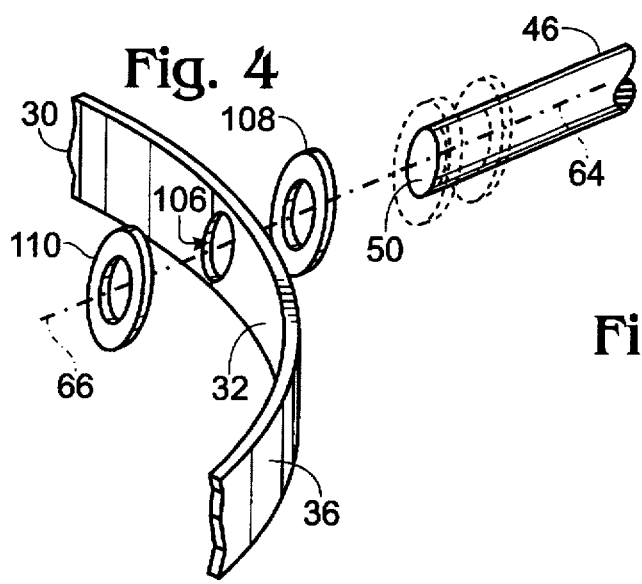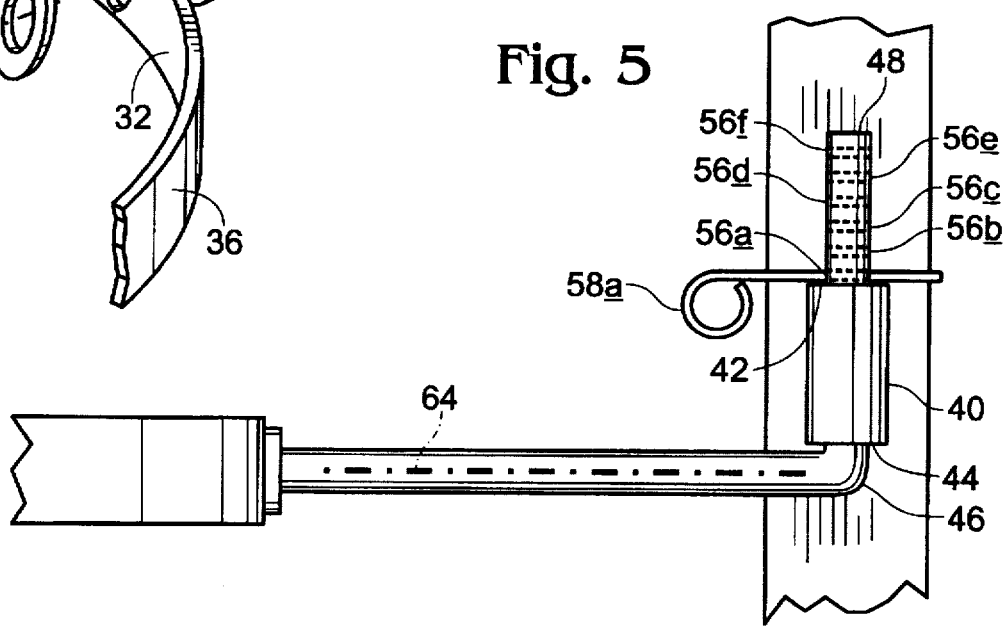

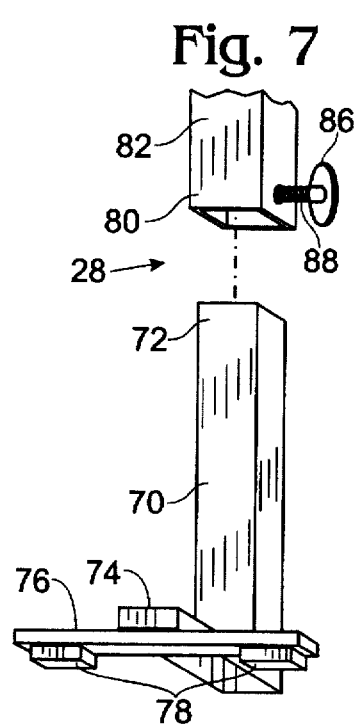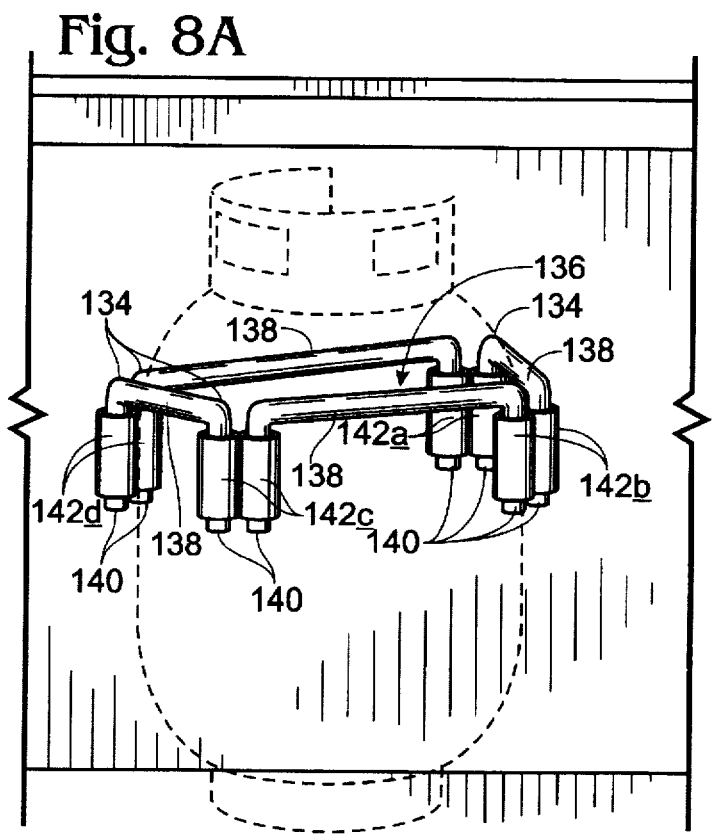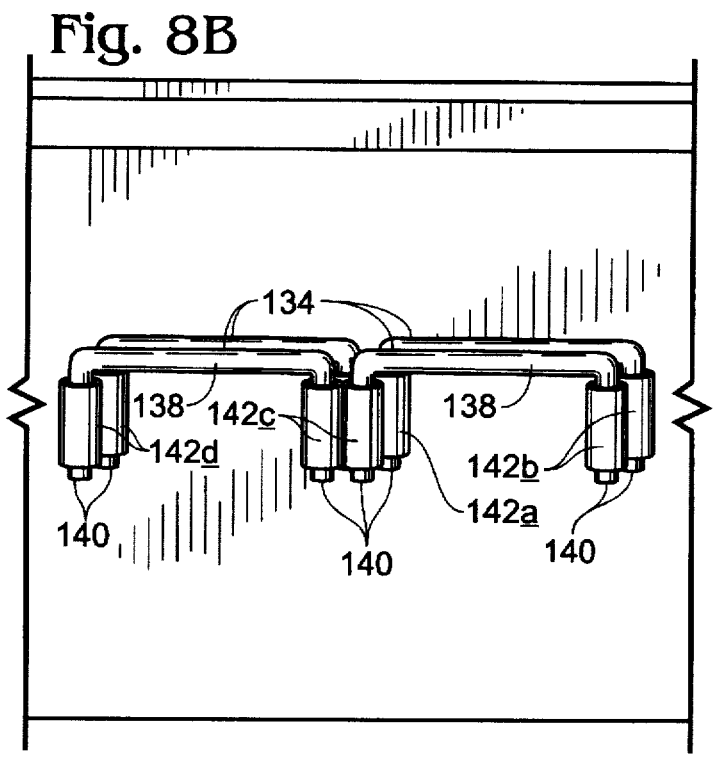

PROPANE TANK SAFETY CARRIER

BACKGROUND

The present invention relates generally to a device for securing loads in a vehicle. More specifically, it concerns a carrier that can be anchored to the vehicle, the carrier having a holder for encompassing and securing a load. When the holder is not in use, it may be swung against a wall of the vehicle to minimize tie space occupied by the holder.

FIELD OF THE INVENTION

Propane tanks are an example of an object that requires securing for transport. Propane in tanks is used by consumers in a variety of ways including gas barbecues, heating, and cooking in motor homes, etc. Typically, the consumer purchases a tank which is periodically refilled at a store requiring the consumer to transport the tank in both the filled and empty conditions.

These tanks are preferably carried in the open bed of a truck to minimize transport hazards. This is because the tanks generally include a relief valve that allows the propane gas to escape when heated. The relief valve prevents the tank itself from exploding under increased gas pressure but if the tank is in a confined area, such as a truck cab or a car trunk, the gas will escape to the confined area and may be detonated there by a spark caused by opening a truck door or trunk lid. Propane tanks are made of metal and are somewhat top-heavy which makes them susceptible to bouncing and tipping if transported unsecured in the truck bed.

Several prior art devices are adapted to carrying loads in vehicles. U.S. Pat. No. 3,765,635, entitled BRACKET FOR GAS CONTAINERS AND SIMILAR TANKS, discloses a support plate which may be bolted or screwed to a truck wall and a collar bolted to the support plate. The collar is made of two semicircular pieces, hinged together at one end. An upper flange of a tank may be placed within the collar and the pieces may be clamped together opposite the hinged ends, securing the tank. The bracket has the disadvantage that it can only be installed in the truck bed by the drilling of holes in the bed wall to accommodate the bolts or screws. This has an undesirable aesthetic effect, and possibly structural as well, on the truck bed. In addition, because the bracket is permanently mounted in the truck bed, it may interfere with the use of the bed to carry other materials. The only way to recover the space occupied by the bracket is to unbolt it from the wall and remove it completely.

U.S. Pat. No. 4,860,986, entitled MOUNTING RACK, discloses a rack designed to secure a water jug in a truck bed. The rack includes an attachment plate with a bracket that is bolted to a wall of the truck bed. A mounting structure is removably secured to the bracket which extends horizontally from the bracket. A vertical arm is removably attached to the mounting structure. Attached to the arm is a flexible metal semicircular band at a central place on the arm. The free ends of the band secure a belt which may encircle and secure a water jug. The rack has the disadvantage of requiring holes drilled in the truck bed. As with the device of U.S. Pat. No. 3,765,635 discussed above, because the rack is permanently mounted, it can interfere with the use of the bed to carry other objects. The only way to recover the space is to leave the removable parts of the rack behind.

Preferably, a carrier for securing loads in a vehicle would be easily installed without drilling into a wall of the vehicle or otherwise damaging the vehicle. The carrier would permit quick and simple securing of loads when necessary. When the carrier is not being used to secure a load, it is preferable to retain the carrier in the vehicle but to shift the carrier to a configuration in which a minimum amount of space is occupied by the carrier so as to maximize available load space. With the carrier retained in the truck, it can still be used to secure loads should the need arise.

SUMMARY OF INVENTION

Essentially, the invention concerns a novel type of carrier which is anchored in a vehicle and used to secure objects for transport. Specifically, the invented carrier in its preferred embodiment is formed with a frame that may be placed adjacent a wall of the vehicle. A lower end of the frame rests on a floor of the vehicle. The frame includes an adjustable clamping portion that anchors the frame to a downwardly depending lip that is part of the vehicle wall. A tube with open top and bottom ends is welded to the frame in a vertical disposition. An L-shaped arm includes a vertical limb and a horizontal limb joined at the vertex of the L. The vertical limb is inserted into the top of the tube so that a first end of the arm extends out of the bottom of the tube. The vertical limb includes an aperture where a safety pin is inserted to captively hold the vertical limb in the tube. The horizontal limb of the arm remains free to pivot in a generally horizontal plane. The horizontal limb includes a swivel at its end. A holder in the shape of a ring is rotatably mounted on the swivel. The ring can thus be rotated into a generally horizontal position or a generally vertical position, or any position in between.

In the horizontal position, and with the horizontal limb of the arm pivoted away from the wall, a container may be inserted in the ring and thereby secured from horizontal displacement. An adjustable strap having a hook at a distal end and attached to the ring at a proximal end may be connected to an upper flange on the container, securing the container from vertical displacement. When the carrier is not in use, the ring is rotated to the generally vertical position and the horizontal limb of the arm is pivoted against the wall of the vehicle so that the ring is flush against the wall, leaving the floor and space above, where the container had been secured, available for storage of other objects.

The invented carrier has the advantage of being mountable in a vehicle without a requirement for drilling holes in a vehicle wall. The mounting is therefore simplified over the prior devices and the aesthetic and structural impact on the vehicle is minimized.

A further advantage of the invented carrier is that when the carrier is not in use, it may be retained in the vehicle but without taking up space within the vehicle. The carrier leaves the space where it secures containers available to be used by other objects.

A feature of the invented carrier is that it uses advantageously a flange available on an upper surface of a tank to secure the tank with an adjustable hooked strap. Securing the tank is thus made quick and simple.

These and other objects and advantages of the invention will be more fully understood by reference to the accompanying drawings and the detailed description to follow.

3

FIG. 3 is a front view of the carrier in a stowage configuration with the holder rotated on a swivel mount to a vertical position and the arm swung so that the holder is flush against the pickup wall.

FIG. 4 is an exploded view of the swivel mount.

FIG. 5 is a partial front view of the carrier showing the arm coupled to a tube on the carrier frame in an alternative embodiment with a horizontal limb of the arm beneath the tube and a safety pin inserted through a vertical limb of the arm to hold the arm in the tube.

FIG. 6 is a partial side view of the carrier frame in the area where the frame is clamped to a lip on the pickup wall, the lip and wall being shown in cross-section.

FIG. 7 is an exploded view of the telescoping inner and outer members comprising the carrier frame.

FIG. 8a is a perspective view of an alternative embodiment of the invention comprised of pivotally coupled arms shown in the operative configuration.

FIG. 8b is a perspective view of the alternative embodiment shown in the stowage configuration.

DETAILED DESCRIPTION OF THE PREFERRED EMBODIMENT

Figure 1:
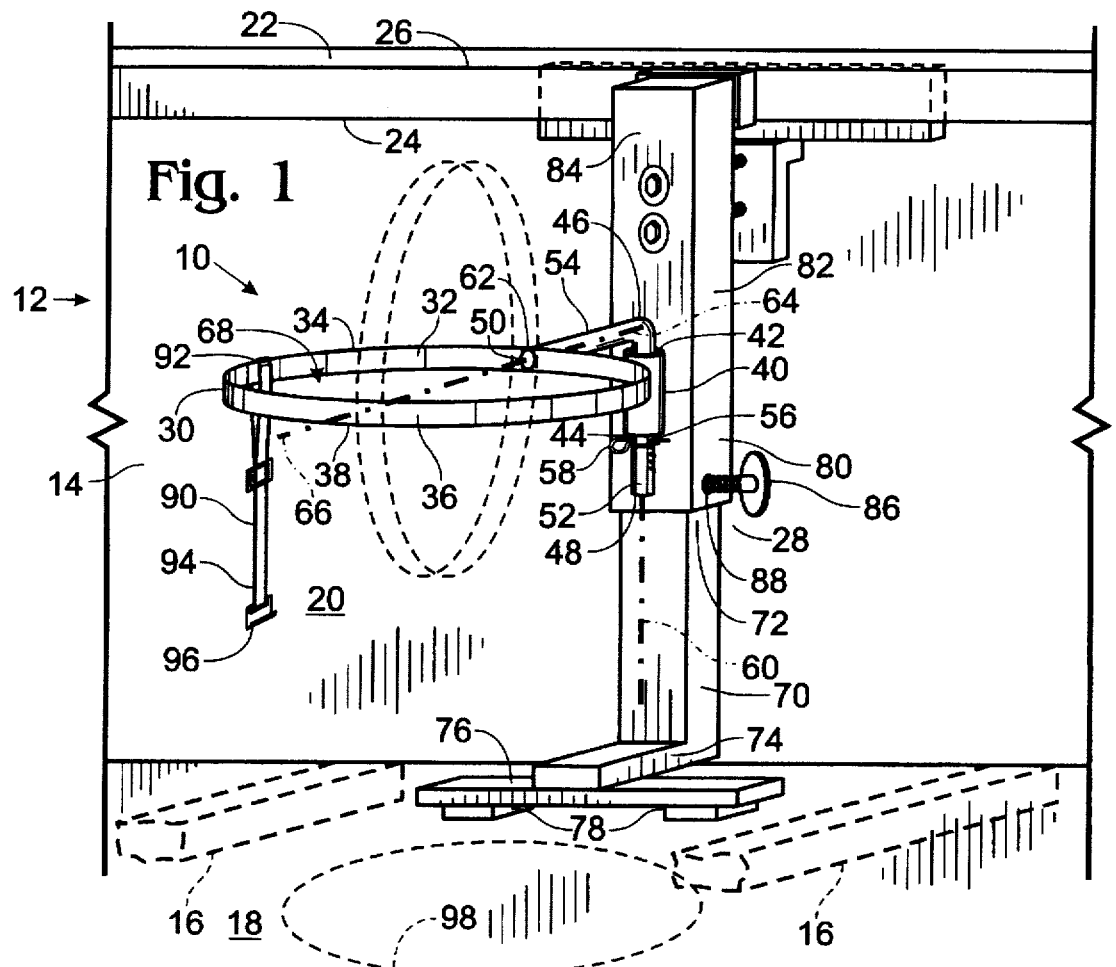
FIG. 1 is a perspective view of the invented safety carrier shown with its holder and arm in an operative configuration prior to loading a propane tank and showing the carrier's frame anchored to a pickup truck wall.

As shown in FIG. 1, a safety carrier constructed according to the present invention is indicated generally at 10. Carrier 10 provides a useful, stowable structure for stabilizing a container in a cargo area of a vehicle.

The carrier is shown installed in a vehicle, e.g., a truck, indicated generally at 12, having a pickup box 14 connected to the truck's frame 16. The pickup box includes a horizontal surface or floor 18 and a wall 20 rising from the floor. Wall 20 is capped by a horizontal ledge 22 which includes a downwardly depending lip 24 on the ledge's inner side 26. The carrier includes a carrier frame 28, preferably made of steel or other suitably sturdy material, which is clamped to lip 24, operatively anchoring the carrier frame to the truck's frame. The manner of clamping will be discussed in more detail below.

A generally rigid, ring-like portion such as ring 30 is coupled to the carrier frame in an articulated manner. The ring includes inner surface 32, upper edge 34, outer surface 36, and lower edge 38. In the preferred embodiment, a metal tube 40, having a top opening 42 and a bottom opening 44, is welded to carrier frame 28 in a vertical disposition. A rigid metal, L-shaped arm 46, sized to be receivable in tube 40 and having a first end 48 and a second end 50 couples the ring to the carrier frame. The arm's L is comprised of a vertical limb 52 extending from first end 48 to a horizontal limb 54 extending perpendicularly with respect to the vertical limb out to second end 50.

In assembling the carrier, first end 48 of arm 46 is inserted into top opening 42 of tube 40 and allowed to drop through the tube and emerge through bottom opening 44. The arm includes a safety pin aperture 56 defined radially through the vertical limb where a safety pin 58 is inserted to capture the arm in the tube by preventing upward movement of the vertical limb back up through the tube. The safety pin shown in FIG. 1 will also limit the extent to which the arm can pivot which is advantageous in stabilizing a container. However, the safety pin could be made in a C-shape fitting closely around the vertical limb with the points of the C inserted in the safety pin aperture to prevent upward movement of the arm without limiting pivotal motion of the arm. The arm is free to pivot in the tube about a vertical axis 60, either with the safety pin removed or with a non-limiting safety pin

4 installed, so that the horizontal limb can move in a generally horizontal plane.

Ring 30 is rotatably mounted at second end 50 of arm 46 on a swivel mount 62 which will be discussed in greater detail below. The horizontal limb of arm 46 extends outwardly from the carrier frame along an elongate, generally horizontal axis 64. The swivel mount permits ring 30 to rotate about an axis 66 collinear with axis 64. The ring therefore is free to rotate from a generally horizontal position to a generally vertical position, shown in FIG. 1 in broken lines, or any position in between. In addition, since the ring is mounted at the end of an arm free to pivot in the horizontal plane, the ring is articulable between an operative configuration wherein the ring projects substantially out into the pickup box and over the floor and presents a stable, central, horizontal aperture 68 while remaining coupled to the carrier frame and a stowage configuration wherein the ring is substantially withdrawn from projecting over the floor while remaining coupled to the carrier frame. Furthermore, the ring is selectively changeable between the configurations and remains coupled to the frame while being changed.

The carrier frame includes an inner member 70 having an upper end 72 and a lower end 74 which extends horizontally from the inner member. The lower end is welded to a base 76 which rests on pads 78. Upper end 72 fits into a hollow lower end 80 of an outer member 82 of the carrier frame. The outer member includes an upper end 84 where the carrier frame is clamped to lip 24. The inner member is thus telescopically received in the outer member and the height of the carrier frame may be adjusted by changing the relative position of the inner and outer members. A thumbscrew 86 is installed in a threaded hole 88 in hollow lower end 80 which may be tightened to fix the relative position of the inner and outer members.

An adjustable strap 90 is connected at a proximal end 92 to ring 30. At a distal end 94 of the strap, a hook 96 is affixed that is useful in securing a container, as will soon become apparent.

In FIG. 1, ring 30 is shown in the operative configuration in which central aperture 68 of the ring projects a footprint 98 on the floor of the pickup box. The ring is generally stable in this position and need not be held in place while a container is lifted up above the ring and lowered through the ring to a position on the floor roughly coinciding with footprint 98.

Figure 2:
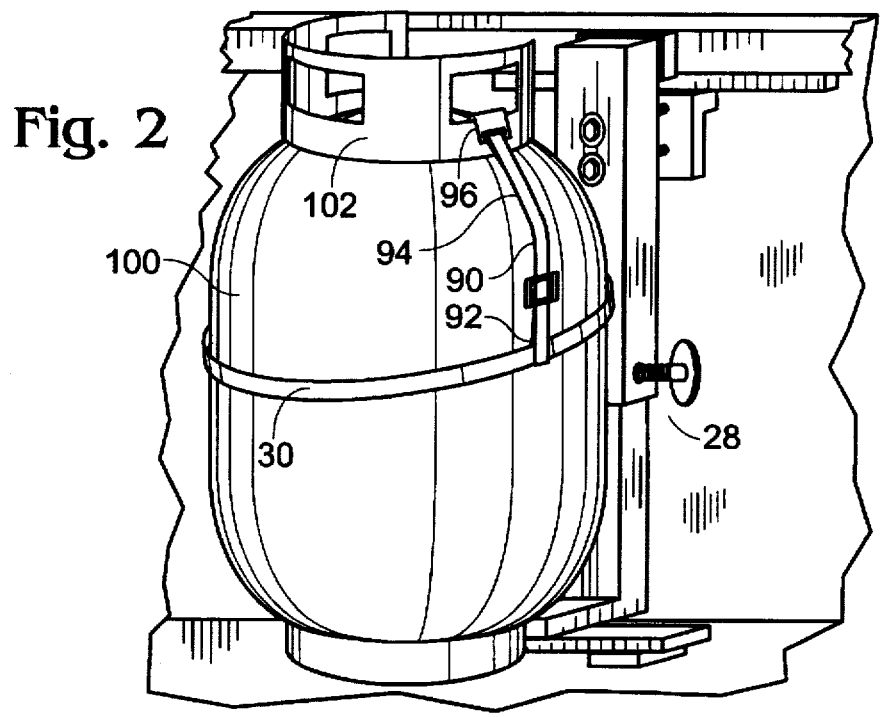
FIG. 2 is a perspective view of the safety carrier with the propane tank loaded in place and a strap attached to the holder and hooked to a flange on the tank.

As seen in FIG. 2, with the carrier still in the operative configuration, a container, such as pressure-fluid bottle or propane tank 100, has been placed through ring 30 onto the floor. The ring acts as a holder by encircling and fitting closely about the tank. Bottle 100 includes an upper flange 102 to which hook 96 has been attached. The strap has been adjusted so that the hook holds the bottle tightly. In this operative configuration, the bottle is restrained against horizontal displacement by the encircling ring. The bottle is also pinned down to the floor by the strap and hook to prevent vertical displacement.

In FIG. 3, carrier 10 is shown in the stowage configuration with ring 30 rotated to a generally vertical position and swung, by pivoting arm 46, flush against wall 20. A C-shaped safety pin 104 is installed in safety pin aperture 56 which retains the arm in the tube without preventing pivotal motion.

FIG. 4 is an exploded view of the swivel mount for the ring at second end 50 of arm 46. An opening 106, sized to receive end 50, is defined through ring 30 from outer surface 36 to inner surface 32. A first washer 108 is welded onto arm 46 so that ring 30 may be mounted at opening 106 on arm 46 with end 50 extending through opening 106. The swivel mount is completed by a second washer 110 welded onto arm 46 at end 50 capturing ring 30 on the arm but permitting rotation of the ring about axis 66.

FIG. 5 shows an alternative embodiment of the carrier with arm 46 coupled to the carrier frame at a selectable relative height. In this embodiment, first end 48 of arm 46 is inserted through bottom opening 44 of tube 40 and emerges from top opening 42. The arm includes a plurality of safety pin apertures 56a-f. A user may adjust the height of the ring relative to the carrier frame by moving the arm up or down in the tube as desired and inserting a safety pin 58a in the appropriate one of apertures 56a-f to capture the arm at the selected height.

As best seen in FIG. 6, the carrier frame is mounted to lip 24 by a metal clamp 112 bolted to the upper end of the carrier frame. The clamp includes a carrier frame portion 114 which is generally parallel to and adjacent the carrier frame, a bridge portion 116 extending generally horizontally away from the carrier frame, and a lip-clamping portion 118 extending generally vertically from the bridge portion. When the carrier frame is placed adjacent the lip with clamp 112 in place, lip-clamping portion 118 is disposed on a side 120 of the lip opposite the carrier frame. The clamp has a pair of holes 122 defined therethrough alignable with a pair of holes 124 in the carrier frame. A pair of bolts 126 are inserted through holes 122, 124 with four washers 128 installed on the bolts. The clamp is tightened onto the lip by a pair of nuts 130 installed on the bolts and adjusted to secure the lip between the clamp and carrier frame. A pair of pads 132 are installed, one each on the carrier frame and on the clamp at the points of contact with the lip.

FIG. 7 is an exploded view of the telescopic inner and outer members comprising the carrier frame showing how the hollow lower end of the outer member is adapted to receive the narrower upper end of the inner member.

FIG. 8a shows an alternative embodiment of the carrier where the holder is formed of four generally U-shaped arms 134 coupled together in a diamond-like shape with the arms pivotal with respect to one another in a generally horizontal plane. The holder is thus articulable between an operative configuration, wherein the holder projects substantially over the horizontal surface and presents a stable, central, horizontal aperture 136 while remaining coupled to the carrier frame, and a stowage configuration, wherein the holder is substantially withdrawn from projecting over the horizontal surface while remaining coupled to the carrier frame. Furthermore, the holder is selectively changeable between the configurations and remains coupled to the frame while being changed. In this alternative embodiment, each arm has a center piece 138 and two downwardly depending limbs 140. Two metal tubes 142a, similar to tube 40, are welded to the wall of the pickup box beneath the lip and a limb of two of the arms is inserted in each of the tubes. Three more pairs of tubes 142b, 142c, 142d are welded together side-by-side and remaining limbs of the arms are inserted in the tubes creating the diamond-like shape. The alternative embodiment is shown in FIG. 8b with the arms collapsed together in the stowage configuration.

As can be seen from the foregoing, the safety carrier of the present invention meets all the desired objectives and has the advantages lacking in the prior art. The adjustable clamp, which is adapted to be secured to the lip of the pickup box wall, allows the carrier to be anchored to the truck frame without drilling holes into the truck. The articulated arm and ring of the carrier allow it to be quickly and easily adapted to secure a load and just as quickly stowed out of the way when not being used to secure a load. When used to secure a load, the carrier restrains the load from both horizontal and vertical displacement. While stowed, the carrier remains anchored to the truck frame and is ready to be adapted for load-securing when the need arises.

While the present invention has been shown and described with reference to the foregoing preferred and alternate embodiments, it is to be understood by those skilled in the art that other changes in form and detail may be made therein without departing from the spirit and scope of the invention as defined in the appended claims.

We claim:

1. A safety carrier for stabilizing a pressure-fluid bottle in an upright position in a truck having a pickup box with a wall, the safety carrier comprising:
   a carrier frame configured to be operatively anchored to the pickup box; and
   a generally rigid portion, generally having the shape of a ring and including a central aperture configured to receive and fit closely about a portion of such a pressure-fluid bottle, the generally rigid portion being coupled in an articulated manner to the carrier frame to allow a user selectively to change the generally rigid portion back and forth between an operative configuration in which the generally rigid portion is generally horizontally oriented and projects out into the pickup box to receive and stabilize the bottle, and a stowage configuration in which the generally rigid portion is generally vertically oriented and disposed adjacent the wall of the pickup box, where the generally rigid portion remains coupled to the carrier frame in the operative and stowage configurations and during the change therebetween by the user.

2. The safety carrier of claim 1 further comprising an arm having a first and a second end, the arm being pivotally coupled to the carrier frame adjacent the first end and pivotally coupled to the generally rigid portion adjacent the second end.

3. The safety carrier of claim 1 for use in the truck wherein the pickup box wall includes a lip and wherein the carrier frame is adapted to be disposed adjacent the lip and further comprising a clamp coupled to the carrier frame, the carrier frame and the clamp being adapted to secure the frame to the lip.

4. The safety carrier of 3 wherein the clamp has a carrier frame portion coupled to the carrier frame, a bridge portion extending generally horizontally away from the carrier frame portion, and a lip-clamping portion extending generally vertically from the bridge portion so that when the carrier frame is placed adjacent the lip, the lip-clamping portion is disposed on a side of the lip opposite the carrier frame, and wherein the clamp is adjustably coupled to the carrier frame so that the clamp and carrier frame may be adjusted to secure the frame to the lip.

5. The carrier of claim 1 wherein the carrier frame is adjustable in height.

6. The carrier of claim 5 wherein the carrier frame comprises an inner member having a lower end and an upper end and an outer member having an upper end and a hollow lower end, the upper end of the inner member being telescopically receivable in the hollow lower end of the outer member so that the user may adjust a relative position of the inner and outer members.

7. The carrier of claim 1 adapted for stabilizing the bottle wherein the bottle includes an upper flange, the carrier further comprising a strap having a distal end, a proximal end, and a hook adjacent the distal end, the strap being secured at the proximal end to the generally rigid portion, the hook being securable to the flange to stabilize the bottle against vertical movement.

8. The safety carrier of claim 1 wherein the generally rigid portion may be adjusted in height relative to the carrier frame.

9. A safety carrier for stabilizing a pressure-fluid bottle in an upright position in a truck having a pickup box with a floor and a wall, the safety carrier comprising:

a carrier frame configured to be operatively anchored to the pickup box; and a generally rigid portion, generally having the shape of a ring and including a central aperture configured to receive and fit closely about such a pressure-fluid bottle, the generally rigid portion being coupled in an articulated manner to the carrier frame to allow a user selectively to change the generally rigid portion back and forth between an operative configuration in which the aperture projects a footprint on the box floor and a stowage configuration in which the projection of the footprint on the floor by the aperture is substantially eliminated, where the generally rigid portion remains coupled to the carrier frame in the operative and stowage configurations and during the change therebetween by the user.

10. The safety carrier of claim 9 further comprising an arm having a first and a second end, the arm pivotally coupled to the carrier frame at the first end and pivotally coupled to the generally rigid portion at the second end.

11. The safety carrier of claim 10 wherein the carrier frame further comprises a vertically disposed tube and the arm is L-shaped having a vertical limb extending from the first end to a horizontal limb extending perpendicularly with respect to the vertical limb from the vertical limb to the second end, the vertical limb being receivable in the tube so that the horizontal limb can pivot horizontally between an operative position projecting out over the floor and a stowage position adjacent the wall.

12. The safety carrier of claim 11 wherein the first end of the arm projects through the tube when the vertical limb is inserted therein and the vertical limb further includes a safety pin aperture defined therethrough at a point on the vertical limb that projects out of the tube and further comprising a safety pin insertable in the aperture for capturing the arm in the tube.

13. The safety carrier of claim 12 wherein the vertical limb of the arm includes a plurality of safety pin apertures for capturing the arm at a selectable height.

14. The carrier of claim 9 adapted for stabilizing the bottle wherein the bottle includes an upper flange, the carrier further comprising:

a strap having a distal end, a proximal end, and a hook adjacent the distal end, the strap being secured at the proximal end to the generally rigid portion, the hook being securable to the flange to stabilize the bottle against vertical movement.

15. A safety carrier for stabilizing a propane tank in a truck having a pickup box with a floor and a wall rising from the floor, the carrier comprising:

a carrier frame configured to be secured to the wall;

an arm having a first end pivotally coupled to the carrier frame for pivotal motion about a vertical axis, the arm extending outwardly along an elongate, generally horizontal axis from the carrier frame to a second end; and a generally rigid ring rotatably mounted on the second end of the arm so that the ring can rotate about an axis collinear with the elongate, generally horizontal axis of the arm, the ring being adapted to encircle and fit closely about such a tank when the tank is placed on the floor, thereby to stabilize the tank against horizontal movement, the ring and the arm thus being articulated so that the ring can be changed by the user back and forth between a generally horizontal, operative configuration projecting out over the floor for encircling the tank and a generally vertical, stowage configuration with the ring swung flush against the wall.

16. The carrier of claim 15 adapted for stabilizing the tank wherein the tank further includes an upper flange, the carrier further comprising an adjustable strap having a distal end, a proximal end, and a hook adjacent the distal end, the strap being secured at the proximal end to the ring, the hook being securable to the flange to stabilize the tank against vertical movement.

17. A system for stabilizing a removable container which includes an upper flange in a vehicle having a frame and a horizontal surface coupled to the frame, the system comprising:

a carrier frame configured to be operatively anchored to the vehicle frame; and a holder coupled to the carrier frame, the holder being articulable between an operative configuration wherein the holder projects substantially over the horizontal surface and presents a stable horizontal aperture while remaining coupled to the carrier frame and a stowage configuration wherein the holder is substantially withdrawn from projecting over the horizontal surface while remaining coupled to the carrier frame, the holder being selectively changeable between the configurations and remaining coupled to the frame while being changed; and an adjustable strap having a distal end, a proximal end, and a hook adjacent the distal end, the strap being secured at the proximal end to the holder, the hook being securable to the flange to stabilize the container against vertical displacement.

18. The system of claim 17 further comprising an arm coupling the holder to the carrier frame, the arm having a first end pivotally coupled to the carrier frame so that the arm may pivot horizontally, the arm further having a second end rotatably coupled to an edge of the holder so that the holder may rotate about an axis between a generally horizontal position and a generally vertical position.

19. The system of claim 17 wherein the vehicle includes a lip coupled to the vehicle frame and the carrier frame is adapted to be disposed adjacent the lip and further comprising a clamp coupled to the carrier frame, the carrier frame and clamp being adapted to secure the frame to the lip.

* * * * *